Figure 1A:
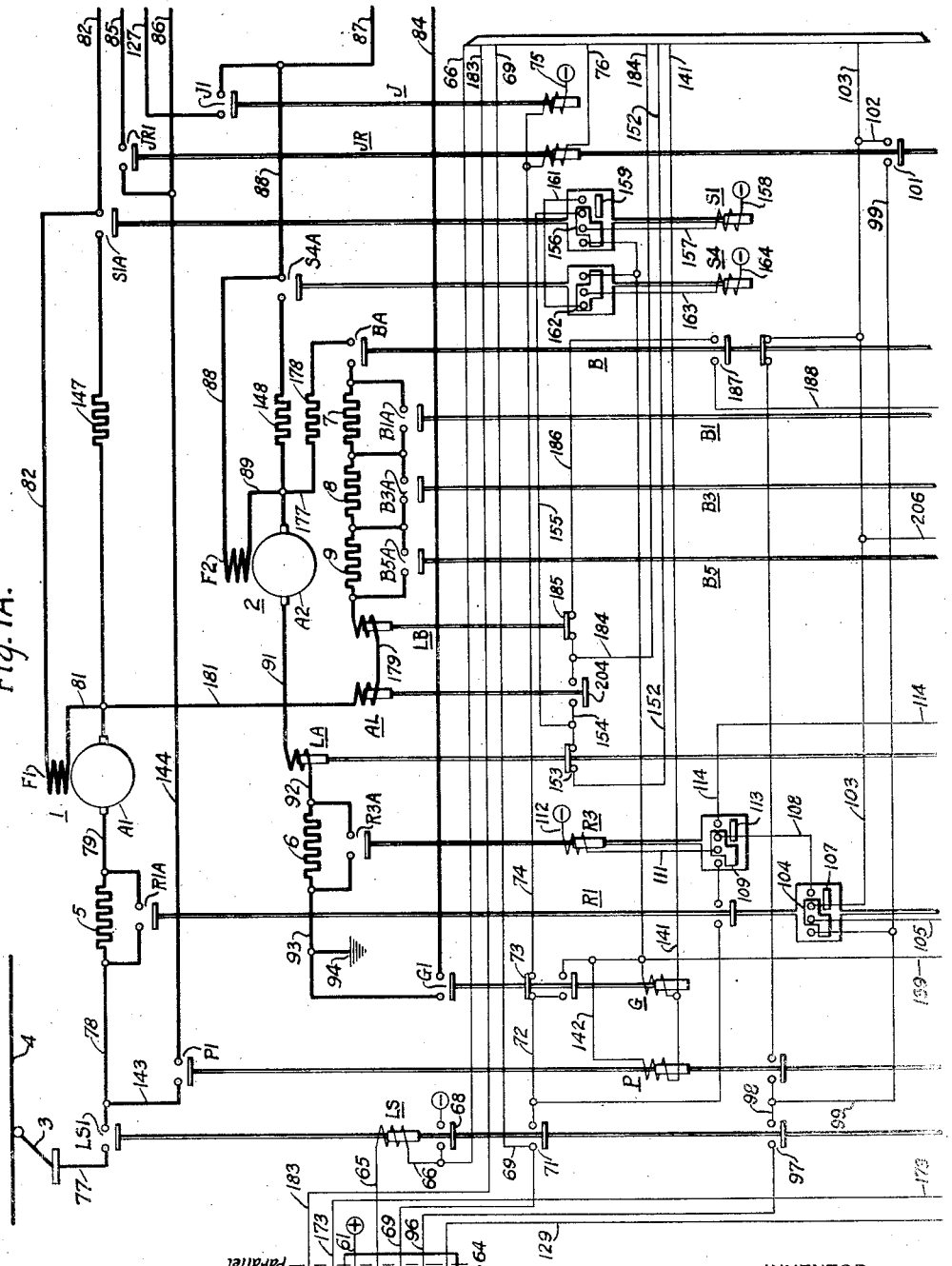

Sept. 20, 1938. L. G. RILEY 2,130,858
MOTOR CONTROL SYSTEM
Filed Nov. 13, 1934 4 Sheets-Sheet 1

WITNESSES:

INVENTOR
Lynn G. Riley.
ATTORNEY

Sept. 20, 1938.  L. G. RILEY  2,130,858
MOTOR CONTROL SYSTEM
Filed Nov. 13, 1934   4 Sheets-Sheet 2

WITNESSES:

INVENTOR
Lynn G. Riley.
ATTORNEY

Sept. 20, 1938.  L. G. RILEY  2,130,858
MOTOR CONTROL SYSTEM
Filed Nov. 13, 1934  4 Sheets-Sheet 3

WITNESSES:
Leon J. Jaza

INVENTOR
Lynn G. Riley.
BY
ATTORNEY

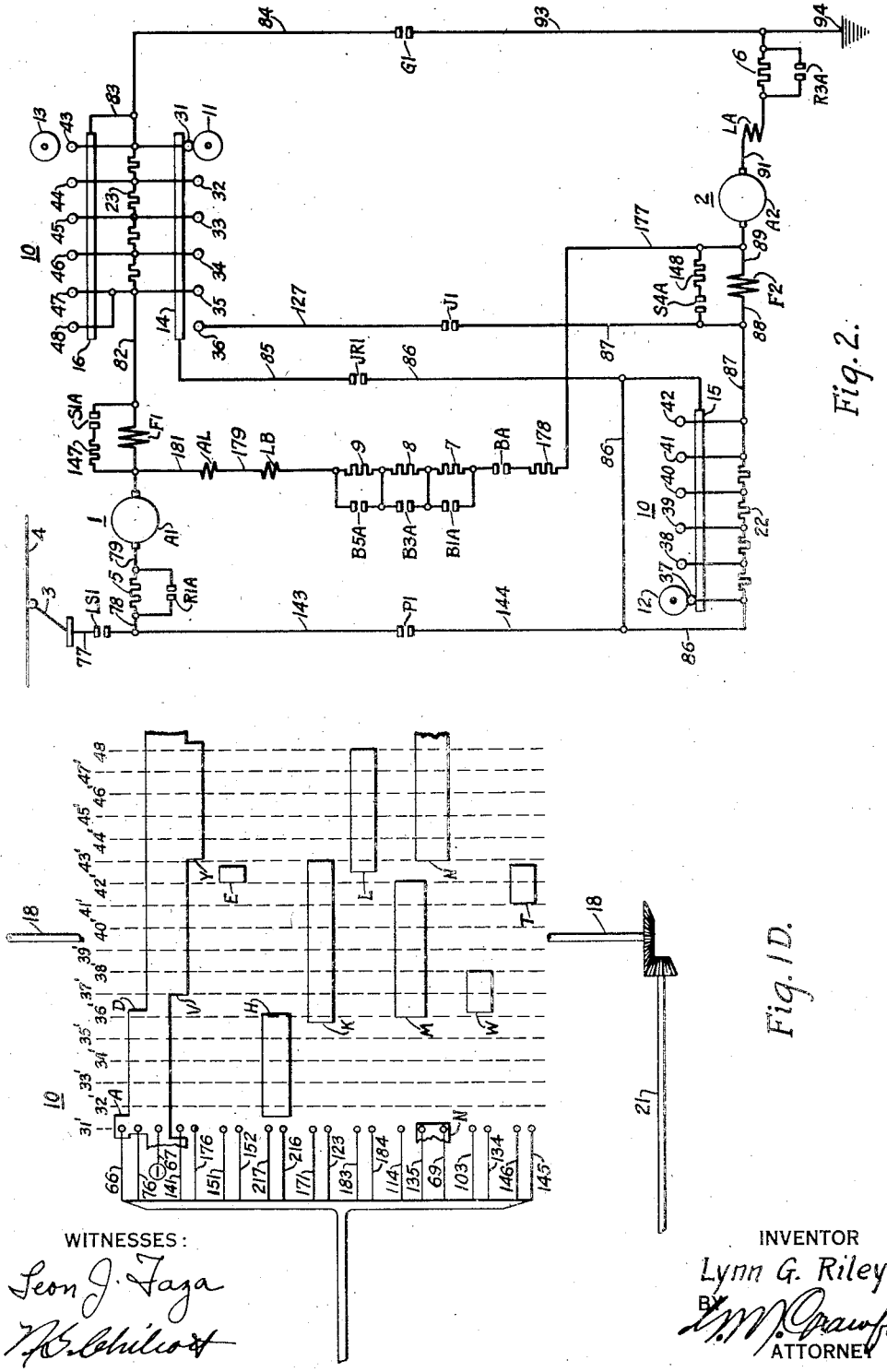

Patented Sept. 20, 1938

2,130,858

UNITED STATES PATENT OFFICE 2,130,858

MOTOR CONTROL SYSTEM

Lynn G. Riley, Pittsburgh, Pa., assignor to Westinghouse Electric & Manufacturing Company, East Pittsburgh, Pa., a corporation of Pennsylvania Application November 13, 1934, Serial No. 752,802

20 Claims. (Cl. 172—179)

My invention relates, generally, to motor control systems and more particularly to systems for automatically controlling the acceleration and the deceleration of the propelling motors of electric vehicles, such as street cars, subway and rapid transit trains.

An object of the invention, generally stated, is to provide an automatic control system which shall be simple and efficient in operation and which may be economically manufactured and installed.

A more specific object of the invention is to provide for the rapid and smooth acceleration of an electrically propelled vehicle.

Another object of the invention is to maintain a uniform rate of acceleration of a vehicle for various loadings up to a predetermined maximum load.

A further object of the invention is to provide for smoothly decelerating a vehicle by means of electrical braking.

A still further object of the invention is to provide for decelerating an electric vehicle by electrical braking independently of the source of power for the propelling motors of the vehicle.

Other objects of the invention will be explained fully hereinafter or will be apparent to those skilled in the art.

According to one embodiment of the invention the propelling motors of an electric vehicle are arranged for series-parallel acceleration, with bridging transition, and also for dynamic braking with the armature of one motor energizing the field winding of the other motor. The major portion of the accelerating resistance and part of the braking resistance is cut out of the motor circuit in small increments by means of a motor-driven accelerator.

The accelerator comprises a circular copper bus divided into three insulated sections inside of which are disposed a plurality of contact fingers which are progressively forced against the bus by the action of three revolving rollers spaced 120° apart and driven by a pilot motor through a common shaft. As each contact member is pressed against the bus bar a small step of resistance is shunted from the motor circuit. A large number of cam switches are located in the accelerator which function to partially control the operation of the accelerator and the propelling motors of the vehicle. Additional switch units are also provided for controlling the propelling motors both during acceleration and deceleration of the car. The accelerator rotation is coordinated with the operating sequence of the switch units to produce starting, series acceleration, series-parallel transition, parallel acceleration, coasting and dynamic braking, in regular order.

Figure 1B:
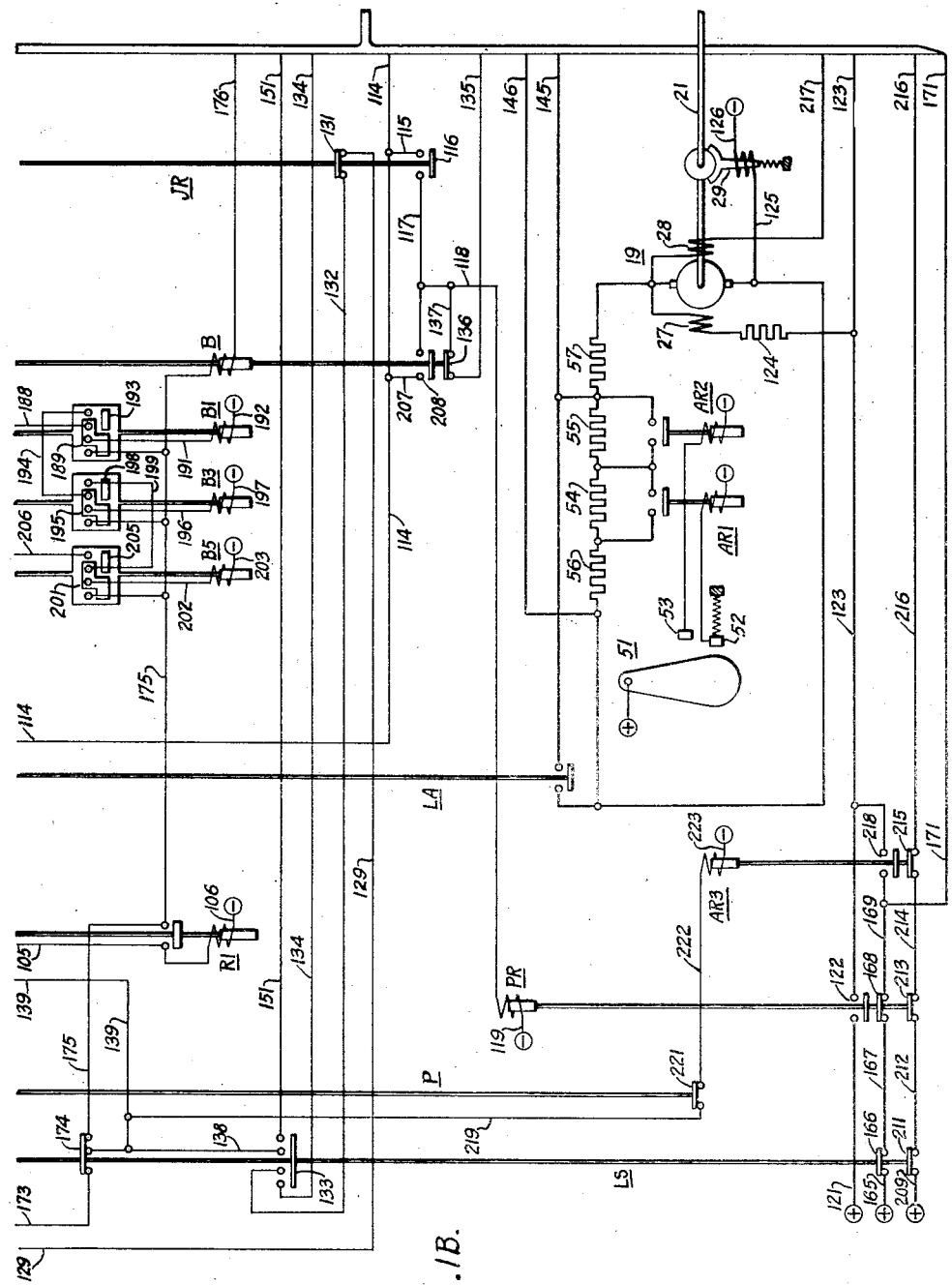
Figures 1C, 3:
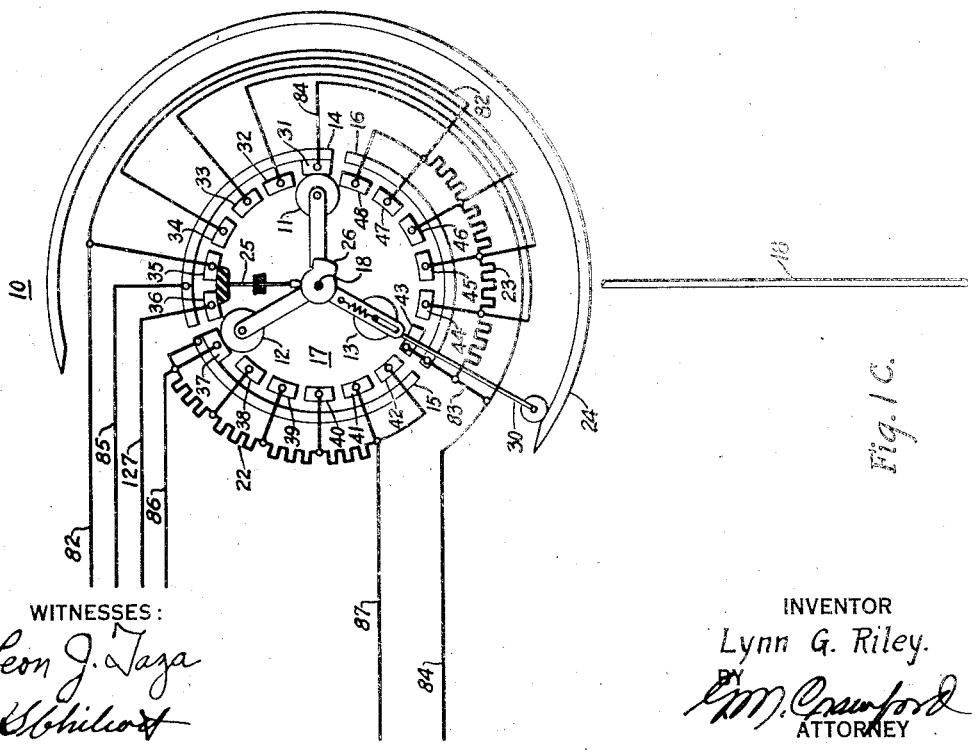

For a further understanding of the nature and objects of the invention, reference may be had to the following detailed description, taken in conjunction with the accompanying drawings, in which:

Figures 1A, 1B, 1C and 1D constitute a diagrammatic view of a control system embodying the invention, Fig. 2 is a schematic diagram showing the main circuit connections for the motors and control apparatus, and Fig. 3 is a chart, showing the sequence of operation of a portion of the apparatus illustrated in Figs. 1 and 2.

The four sheets of the drawings may be assembled by placing Fig. 1B at the bottom of Fig. 1A, Fig. 1C to the right of Fig. 1A and Fig. 1D at the bottom of Fig. 1C and to the right of Fig. 1B.

Referring to the drawings, two motors 1 and 2 may be utilized for propelling an electric vehicle (not shown). The motors 1 and 2 are of the series type, having armature windings A1 and A2, and series field windings F1 and F2, respectively. An electrically-operated line switch LS is provided for connecting the motors to a current collecting device 3 which engages a power conductor 4.

In accordance with the usual practice in railway control systems, the motors 1 and 2 are first connected in series-circuit relation and then in parallel-circuit relation during the acceleration of the vehicle. Electrically operated switches J and JR are provided for establishing the series connections and switches P and G established the parallel connections.

The motors may also be connected for dynamic braking with the field winding F2 connected across the armature A1 and the field winding F1 connected across the armature A2, thereby permitting the current in the armature windings to reverse and cause the motors to act as generators and retard the vehicle. A switch B, together with the switches P and G, establishes the dynamic braking connections.

A master controller MC is provided for controlling the motor connections both during acceleration and braking. As shown, the controller is of the drum type, having a central control "off" position with accelerating positions on one side and braking positions on the other. On the accelerating side there are three positions, namely, "Switching," "Series" and "Parallel". With the controller handle at the switching position, the motors are connected in series with all of the external resistance. With the handle at the series position, the control progresses automatically to the full series running position and when the handle is placed at the parallel position, the control progresses automatically to the full parallel running position, which includes shunting of the motor fields by switches S1 and S4 to provide maximum speed of the motors. The automatic progression may be held at any position by returning the handle to the switching notch.

On the braking side there are a "Hold" position and a "Brake" position. With the handle at the holding position the braking connections are established with all the external resistance in the circuit. When the handle is moved to the braking position, the control automatically progresses giving the full braking effect. If at any time the handle is returned to the holding position, the automatic progression is held until the handle is again returned to the braking position. This feature is useful in holding a train at a constant speed down a grade.

A plurality of resistors 5 and 6 are connected in the motor circuit to control the motor current during acceleration and resistors 7, 8 and 9 are also utilized during dynamic braking to contol the motor current. Resistor shunting switches R1, R3, B1, B3 and B5 are provided for shunting the resistors 5, 6, 7, 8 and 9, respectively. In order to simplify the drawings, the number of resistors shown has been reduced, it being understood that additional resistors and shunting switches may be readily provided.

In addition to the foregoing resistors and shunting switches, a major portion of the accelerating resistance and a part of the braking resistance are cut out of the motor circuit in small increments by means of a motor-driven accelerator 10, which is of the same general type as the one disclosed in my copending application, Serial No. 667,367, filed April 22, 1933, now Patent No. 1,991,229, the present accelerator being provided with three rollers 11, 12 and 13 instead of only one roller as shown in the foregoing application.

The accelerator 10 comprises a circular copper bus divided into three insulated sections 14, 15 and 16, inside of which are disposed a plurality of contact fingers 17 which are progressively forced against the bus by the action of the three revolving rollers 11, 12 and 13, which are spaced 120° apart. The three rollers are operated in unison by a common shaft 18, driven by a pilot motor 19 which is geared to the shaft 18 through a shaft 20.

The accelerator is provided with two duplicate sections of resistors 22 and 23, each section being divided into a number of subdivisions or steps which are connected to the contact fingers 17. The resistor 22 is connected to contact fingers 37 to 41, inclusive, as shown in Fig. 1C. The resistor section 23 is connected to two parallel sets of contact fingers, the fingers 31, 32, 33, 34 and 35 being connected to fingers 43, 44, 45, 46 and 47, respectively, and a roller passing over either set of contact fingers cuts out the same set of resistors. Accordingly, the roller 13 is prevented from engaging the contact fingers by means of a cam 24 and a push rod 30 through approximately 240° of travel, thereby reducing the load on the pilot motor 19. The roller 13 is permitted to engage contact fingers only during dynamic braking of the motors 1 and 2, as will be explained more fully hereinafter.

It will be seen that contact fingers 35 and 36 will be depressed by a push rod 25, which is actuated by a cam 26, as the roller 11 passes over these fingers. The push rod 25 will hold the fingers 35 and 36 against the bus bar 14 after roller 11 has passed over them in order that the motor circuit will not be interrupted during transition from series to parallel operation.

As shown in Fig. 1D, a number of cam switches A, D, E, H, K, L, M, N, V, W, Y and T are located in the accelerator 10 and actuated by the shaft 18, which also drives the rollers 11, 12 and 13. The reference numerals 31' to 48', inclusive, indicate the contact fingers over which the roller 11 travels while the cam switches are closed. The function of the various cam switches will be explained as the description of the control system proceeds.

The pilot motor 19 is provided with two field windings 27 and 28, one for each direction of rotation. A brake 29 is provided for stopping the motor, the brake release coil being connected in series with the pilot motor and deenergized when the motor is deenergized. The pilot motor is at all times under the control of a relay PR and is energized directly from the source of control potential, which may be a battery or other reliable source of power, independently of the master controller.

The speed of the pilot motor 19 during acceleration is controlled by accelerating relays AR1 and AR2 and also by a current limit relay LA, the coil of which is energized by the traction motor current. The operating coils of the relays AR1 and AR2 are energized through a retardation controller 51 which is an inertia or pendulum device which responds to acceleration and deceleration impulses and is provided with contact members 52 and 53 that are closed at a predetermined setting. While intended primarily for the regulation of the air brake system (not shown), it may also be utilized during acceleration to maintain a uniform accelerating rate regardless of train weight.

The relay AR1 is energized at a predetermined rate of acceleration and the relay AR2 at a slightly higher rate. When the contact members of the relays AR1 and AR2 are closed, resistors 54 and 55, which are normally connected across the armature of the pilot motor 19, are shunted, thereby decreasing the armature current and reducing the speed of the pilot motor. The limit relay LA shunts both resistors 54 and 55 and a third resistor 56 to further decrease the speed of the pilot motor, which, in turn, decreases the rate at which resistance is shunted from the traction motor circuit by the accelerator 10. A resistor 57 is permanently connected across the armature of the pilot motor.

At no time during the starting cycle does the accelerator stop moving, unless the master controller is moved back to the switching position. However, during braking, the traction motor current is held constant at all speeds and all car weights, a limit relay LB being connected to govern the progressive closing of all "B" and "R" switches during braking and also to stop and start the pilot motor, as the generated current may permit.

If the master controller handle is returned to the "off" position during acceleration while the traction motors are connected in series, the accelerator returns to the initial position. The cam switch H in the circuit of the field winding 28 of the pilot motor 19 limits the back-off feature to accelerator positions below full series. From all other positions, the cam switch K carries the rotation forward. In the event that the master controller is moved to a braking position while the traction motors are connected in series, a relay AR3 maintains the forward operation of the pilot motor until the cam switch K is closed, thereby permitting the accelerator to advance to the braking positions.

At any time during acceleration or braking the progress of the accelerator may be stopped by moving the master controller handle to the switching or the hold position. During acceleration, moving the controller to the switching position causes the resistors 5 and 6 to be inserted in the traction motor circuit and the pilot motor 19 to be stopped. If the controller handle is moved to the hold position during braking, the shunting of the braking resistors is discontinued and the braking rate is gradually reduced.

In order that the functioning of the foregoing apparatus may be better understood, the operation of the control system will now be described. Assuming that it is desired to start the vehicle and accelerate to the maximum speed, the master controller MC may be moved to the full parallel position, thereby closing the line switch LS to connect the motors 1 and 2 to the power source. The energizing circuit for the actuating coil of the line switch LS may be traced from a positive conductor 61 through contact members 62 and 63, bridged by a contact segment 64, conductor 65, the coil of the switch LS, conductor 66 and the cam switch A on the accelerator 10 to a negative conductor 67. A holding circuit is established for the coil of the line switch, when it closes, through an interlock 68 on the line switch.

Following the closing of the line switch LS, the switches J and JR are closed to connect the motors 1 and 2 in series circuit relation. The energizing circuit for the actuating coil of the switch J may be traced from a contact finger 70, which engages the contact segment 64 on the master controller MC, through conductor 69, an interlock 71 on the switch LS, conductor 72, an interlock 73 on the switch G, conductor 74 and the actuating coil of the switch J to a negative conductor 75. The circuit through the actuating coil of the switch JR extends from the previously energized conductor 74 through the coil of the switch JR, conductor 76 and the cam switch D to the negative conductor 67.

The traction motors 1 and 2 are now connected in series circuit relation and in series with all the external resistance in the motor circuit, thereby causing the train to move slowly. The motor circuit may be traced from the power conductor 4 through the current collector 3, conductor 77, the contact members LS1, conductor 78, resistor 5, conductor 79, the armature A1, conductor 81, field winding F1, conductor 82, the resistor 23 in the accelerator 10, conductors 83 and 84, the contact finger 31, which is depressed against the bus bar 14 by the roller 11, the bus bar 14, conductor 85, the contact members JR1, conductor 86, the resistor 22 in the accelerator 10, conductors 87 and 88, the field winding F2, conductor 89, the armature A2, conductor 91, the coil of the limit relay LA, conductor 92, the resistor 6, and conductor 93 to ground at 94.

The main contact members R1A and R3A of the resistor shunting switches R1 and R3, respectively, are next closed by interlock progression to shunt the resistors 5 and 6 from the motor circuit. The circuit for the actuating coil of the switch R1 may be traced from a contact finger 95 on the master controller MC through conductor 96, an interlock 97 on the line switch LS, conductors 98 and 99, an interlock 101 on the switch JR, conductors 102 and 103, an interlock 104 on the switch R1, conductor 105 and the actuating coil of the switch R1 to a negative conductor 106. As soon as the switch R1 closes, a circuit is established for the switch R3 which extends from the previously energized conductor 103 through an interlock 107 on the switch R1, conductor 108, an interlock 109 on the switch R3, conductor 111 and the actuating coil of the switch R3 to a negative conductor 112.

Following the closing of the switch R3, the PR relay is energized, thereby establishing an energizing circuit for the pilot motor 19 which drives the rollers in the accelerator 10, thereby shunting the resistance in the accelerator from the traction motor circuit and causing the speed of the traction motors to increase. The energizing circuit for the actuating coil of the PR relay may be traced from the previously energized conductor 108 through an interlock 113 on the switch R3, conductors 114 and 115, an interlock 116 on the switch JR, conductors 117 and 118 and the actuating coil of the relay PR to a negative conductor 119. The PR relay establishes a circuit for the pilot motor 19 which extends from a positive conductor 121 through contact members 122 on the PR relay, conductor 123, a resistor 124, the field winding 27 and armature of the pilot motor 19, conductor 125, and the release coil of the brake 29 to a negative conductor 126.

The accelerator 10 continues to cut resistance out of the motor circuit under the control of the retardation controller 51 and the accelerating relays AR1 and AR2, as explained hereinbefore, until the roller 11 depresses finger 35. At this point, the push rod 25 is actuated by the cam 26, as previously explained, to depress fingers 35 and 36 against the bus bar 14. When the roller 11 is on finger 36, the cam switch D is opened, thereby interrupting the circuit through the actuating coil of the switch JR which permits the switch to open. The traction motors 1 and 2 are now in the series running position, the motor circuit extending from the bus bar 14 through conductor 127 and the contact members J1 of the switch J to the conductor 88 in place of through the contact members JR1 of the switch JR, which is now open.

Since it has been assumed that the master controller MC is on the full parallel position, the accelerator movement continues without stopping with the traction motors connected in series. The PR relay, which controls the pilot motor, is kept energized through a circuit which may be traced from a contact finger 128 on the master controller through conductor 129, an interlock 131 on the switch JR, conductor 132, an interlock 133 on the line switch LS, conductor 134, the cam switch W, conductor 103, the interlock 107 on the switch R1, conductor 108, the interlock 113 on the switch R3, conductor 114, the cam switch M, conductor 135, an interlock 136 on the switch B and conductors 137 and 118 to the actuating coil of the relay PR.

As explained hereinbefore, the purpose of the push rod 25 and the locking cam 26, which retains the fingers 35 and 36 in contact with the bus bar 14 after the roller 11 has passed over these fingers, is to prevent opening the main motor circuit during the transition period.

When the roller 11 is on contact finger 37 of the accelerator, the cam switch V closes, thereby causing the switches P and G to close. The energizing circuit for the actuating coil of the switch G may be traced from the previously energized conductor 132 through the interlock 133 on the switch LS, conductors 138 and 139, the actuating coil of the switch G, conductor 141 and the cam switch V to the negative conductor 67. The circuit for the actuating coil of the switch P extends from the conductor 139 through conductor 142, the coil of the switch P, and thence through conductor 141 to the negative conductor 67.

The closing of the switch G causes the switch J to open, since the circuit through the interlock 73 is interrupted, and the transition is now complete, the traction motors 1 and 2 being connected in parallel-circuit relation, and each motor is in series with one-half of the resistors mounted on the accelerator 10. The circuit through the motor 1 may be traced from the line switch LS1 through conductor 78, the contacts R1A, conductor 79, armature A1, conductor 81, field winding F1, conductor 82, the resistor 23, conductors 83 and 85, the contacts G1 and conductor 95 to ground at 94. The circuit through the motor 2 may be traced from the contacts LS1 of the line switch LS through conductor 143, the contacts P1, conductors 144 and 86, resistor 22, conductors 87 and 88, the field winding F2, conductor 89, the armature A2, conductor 91, the coil of the limit relay LA, conductor 92, the contacts R2A and conductor 93 to ground at 94.

The rotation of the accelerator rollers continues through the next 120° until the roller 11 depresses the contact finger 42 and the roller 12 depresses the contact finger 48, thereby shunting the resistors 22 and 23 step-by-step from the motor circuits. It will be noted that the cam switch T is closed when the roller 11 passes over the contact finger 41, thereby shunting the resistors 54, 55 and 56, which are in parallel with the armature of the pilot motor 19, and slowing down the speed of the pilot motor as hereinbefore described. The shunt circuit extends through conductors 145 and 146 which are connected to the resistors 55 and 56, respectively. Since the cam switch M opens when the contact finger 42 is reached, which deenergizes the PR relay, the pilot motor is deenergized, and also the release coil of the brake 29, which stops progression of the accelerator rollers.

At this point, the cam switch E is closed, which energizes the actuating coils of the field shunting switches S1 and S4, causing the field windings of the motors 1 and 2 to be shunted through resistors 147 and 148, respectively, by the closing of the contact members S1A and S4A of the switches S1 and S4, thereby producing the maximum speed of the motors. The energizing circuit for the actuating coil of the switch S1 may be traced from the previously energized conductor 132 through an interlock 133 on the line switch LS, conductor 151, the cam switch E, conductor 152, the contact member 153 on the LA relay, conductors 154 and 155, an interlock 156 on the switch S1, conductor 157 and the actuating coil of the switch S1 to a negative conductor 158. Upon the closing of the switch S1, the actuating coil of the switch S4 is energized through a circuit which extends from the previously energized conductor 155 through an interlock 159, conductor 161, an interlock 162 on the switch S4, conductor 163 and the coil of the switch S4 to the negative conductor 164. In this manner the switches S1 and S4 are closed by interlock progression to shunt the field windings F1 and F2 of the motors 1 and 2.

The motors are now connected directly to the line with full voltage applied and maximum speed is attained by shunting the motor fields and the motors will continue to operate at balancing speed until the master controller handle is returned to the off position to permit coasting of the car, in which event the line switch LS is opened to disconnect the traction motors from the power source. The opening of the line switch establishes an energizing circuit for the pilot motor 19 which will cause the accelerator roller 11 to be advanced to the contact finger 43 while the vehicle is coasting. This circuit may be traced from a positive conductor 165 through an interlock 166 on the line switch LS, conductor 167, an interlock 168 on the PR relay, which was deenergized when the master controller was moved to the off position, conductors 169 and 171, the cam switch K, conductor 122, the resistor 124, field winding 27, the armature of the motor 19, conductor 125 and the release coil of the brake 29 to the negative conductor 126. The accelerator will come to rest with the roller 11 on contact finger 43, since the cam switch K is opened when the finger 43 is reached.

From the coasting operation power may be reapplied to the traction motors or dynamic braking may be applied, depending, of course, upon external conditions. In case it is desired to reapply power to the traction motors, the master controller handle is moved to one of the running positions. However, the traction motor circuits will not be established at this time, since the line switch cannot close until roller 11 depresses the contact finger 31, in which position cam switch A is closed, permitting the energization of the actuating coil of the line switch, as previously described. At this time the PR relay is energized through a cam switch N, thereby establishing the energizing circuit for the pilot motor 19 which advances the roller 11 to its initial position on the contact finger 31 which will permit the line switch LS to close to establish the traction motor connections. The energizing circuit for the PR relay may be traced from the contact finger 70 on the master controller through conductor 69, the cam switch N, conductor 135, an interlock 136 on the switch B, conductors 137 and 118 and the coil of the PR relay to the negative conductor 119. From this point, power is applied to the traction motors 1 and 2 in the same manner as hereinbefore described.

In case it is desired to apply dynamic braking to the motor, the master controller handle is moved from coasting to the full braking position, thereby closing the switches P, G and B to establish the dynamic braking connections. The circuit for the actuating coils of the switches P and G may be traced from a contact finger 172 on the master controller through conductor 173, an interlock 174 on the line switch LS, conductors 138 and 139, thence through the actuating coils of the switches P and G and the cam switch V to a negative conductor as previously described. The circuit through the actuating coil of the switch B extends from the interlock 174 on the line switch LS through conductor 175, the actuating coil of the switch B, conductor 176 and the cam switch Y to the negative conductor 67.

As previously described, the field winding F2 of the motor 2 is connected across the armature A1 of the motor 1 and the field winding F1 of the motor 1 is connected across the armature A2 of the motor 2 during dynamic braking, which permits the motors to function as generators, thereby decelerating the car. The circuit through the armature A1 and the field winding F2 extends from one terminal of the armature A1 through conductor 79, resistor 5, conductors 78 and 143, the contact members P1 of the switch P, conductors 144 and 86, the resistor 22, conductors 87 and 88, field winding F2, conductors 89 and 177, resistor 178, the contacts BA of the switch B, resistors 7, 8 and 9, the coil of the limit relay LB, conductor 179, the coil of limit relay AL and conductor 181 to the other terminal of the armature A1. The circuit through the armature A2 and field winding F1 extends from one terminal of the armature A2 through conductor 177, the resistor 178, the contact members BA of the switch B, resistors 7, 8 and 9, the coil of the limit relay LB, conductor 179, the coil of the limit relay AL, conductor 181, the field winding F1, conductor 82, a resistor 23, conductors 83 and 84, the contacts 61, conductor 93, resistor 6, the coil of the limit relay LA and conductor 91 to the other terminal of the armature A2.

It will be recalled that during the acceleration period the roller 13 performed no electrical function, since it was held away from the contact fingers on the accelerator by means of the cam 24. When the roller 11 reaches finger 43, the roller 13 is released and depresses finger 37. During the final 120° for the braking section of the accelerator travel, rollers 11 and 12 function as a single roller, since the contact fingers which they simultaneously depress are electrically connected together.

The auxiliary limit relay AL which is energized during dynamic braking, prevents the shunting of the motor field windings F1 and F2 until a predetermined current value has been reached, thereby ensuring that full field excitation is provided for the motors 1 and 2, causing the generated current to build up rapidly and the braking action to take effect quickly. However, it is undesirable to suddenly produce too great a braking effect. Therefore, the auxiliary limit relay AL is set to cause the motor field windings to be shunted at a comparatively low current value.

The switches B1, B3 and B5, which shunt the braking resistors 7, 8 and 9, start closing by interlock progression upon the establishment of the dynamic braking circuit. The energizing circuit for the actuating coil of the switch B1 extends from a contact finger 182 on the master controller MC through conductor 183, the cam switch L, conductor 184, the contact member 185 of the limit relay LB, conductor 186, an interlock 187 on the switch B, conductor 188, an interlock 189 on the switch B1, conductor 191 and the actuating coil of the switch B1 to a negative conductor 192.

When the switch B1 closes, the circuit is established for the actuating coil of the switch B3 which extends from the previously energized conductor 188 through an interlock 193 on the switch B1, conductor 194, an interlock 195 on the switch B3, conductor 196 and the actuating coil of the switch B3 to the conductor 197.

Likewise, upon the closing of the switch B3 a circuit is established for the actuating coil of switch B5, which extends from the previously energized conductor 194 through an interlock 198 on the switch B3, conductor 199, an interlock 201 on the switch B5, conductor 202 and the actuating coil of the switch B5 to a negative conductor 203. In this manner the switches B1, B3 and B5 are closed by interlock progression to shunt the resistors 7, 8 and 9, respectively, from the motor circuit, the rate of closing of the switches being controlled by the braking limit relay LB in a manner well known in the art.

At some point in the closing sequence of the switches B1, B3 and B5, the generated current reaches a value sufficient to close the auxiliary limit relay AL, which permits shunting the motor fields by closing the field shunting switches S1 and S4. The energizing circuit for the actuating coil of the switch S1 may be traced from the previously energized conductor 184 through the contact members 204 of the limit relay AL, conductors 154 and 155, an interlock 156 on the switch S1, conductor 157 and the actuating coil of the switch S1 to the negative conductor 158. The switch S4 is closed by interlock progression in a manner previously described.

When the switch B5 is closed, a circuit is established for the actuating coil of the switch R1, which extends from the previously energized conductor 199 through an interlock 205 on the switch B5, conductors 206 and 103, an interlock 104 on the switch R1, conductor 105 and the actuating coil of the switch R1 to the negative conductor 106. When the switch R1 closes to shunt the resistor 5, the switch R3 is closed by interlock progression to shunt the resistor 6, as previously described. However, the closing of the switches R1 and R3 is controlled by the braking limit relay LB in the same manner as is the closing of the switches B1, B3 and B5.

When the switch R3 is closed, the conductor 114 is energized, as described hereinbefore, and the PR relay is energized through a circuit which extends from the conductor 114 through conductor 207, an interlock 208 on the switch B, conductors 117 and 118 and the actuating coil of the PR relay to the negative conductor 119. The closing of the PR relay energizes the pilot motor 19 in the manner previously described, and the accelerator 10 progresses through the braking section, which is the final 120° of travel. However, the progression of the accelerator is under the control of the braking limit relay LB, since the energizing circuit for the PR relay, which controls the pilot motor 19 is established by the contact members of the limit relay LB. The limit relay LA does not function during dynamic braking, but controls the speed of the pilot motor only during acceleration in the manner described hereinbefore.

The cam switch L opens at the end of the braking cycle, thereby stopping the pilot motor 19 with roller 11 on contact finger 48. It will be noted that the resistor 178 is not shunted from the motor circuit during dynamic braking. This resistor permits the braking tractive effort to gradually fade out as the speed of the car is decreased and the air brakes may be used to bring the car to a complete stop.

It will be noted that dynamic braking of the vehicle can be maintained regardless of whether or not the current collector 3 is in contact with the power conductor 4, as the traction motors are disconnected from the power source during dynamic braking and all of the control apparatus, including the accelerator 10, is operated from an independent control source, such as a battery.

When the master controller handle is returned to the off position, the accelerator rollers remain in the final braking position until another acceleration is to be made and the master controller is moved to one of the accelerating positions, whereupon the accelerator returns to the starting position, the PR relay being energized through a circuit established through the cam switch N, as previously described.

As stated hereinbefore, if during the accelerating period, the master controller handle is returned to the off position before the accelerator roller 11 has reached finger 36, the accelerator returns to the initial position. The cam switch H, through which the circuit for the reverse field winding 28 of the pilot motor 19 is established, limits the back-off feature to accelerator positions below the full series. From all other positions the cam switch K carries the rotation of the accelerator forward. The circuit which energizes the pilot motor for reverse operation may be traced from a positive conductor 209 through an interlock 211 on the line switch LS, conductor 212, an interlock 213 on the PR relay, conductor 214, an interlock 215 on the relay AR3, conductor 216, the cam switch H, conductor 217, the reverse field winding 28 and the armature of the pilot motor 19, conductor 125 and the release coil of the brake 29 to the negative conductor 126.

As described hereinbefore, the relay AR3 is provided to permit the accelerator to rotate in the forward direction to the braking position instead of returning to the initial position in the event that the master controller handle is moved to a dynamic braking position while the traction motors are connected for series operation. As shown on the diagram, the contact members 218 of the relay AR3 are connected across the conductors 123 and 171, thereby paralleling the cam switch K when the relay AR3 is energized, which causes the accelerator 10 to be advanced to the braking position. The energizing circuit for the actuating coil of the relay AR3 extends from the controller finger 172 on the master controller through conductor 173, an interlock 174 on the line switch LS, conductors 138, 139 and 219, an interlock 221 on the switch P, conductor 222 and the actuating coil of the relay AR3 to a negative conductor 223.

In addition to the foregoing described apparatus, a number of protective interlocks are shown on the diagram. However, since they are not especially involved in the particular apparatus embodying the invention herein disclosed, it is believed to be unnecessary to specifically describe them in the present specification.

From the foregoing description, it is apparent that I have provided a control system which will cause the propelling motors of an electric vehicle to be accelerated rapidly and smoothly. It is also evident that I have provided for smoothly and effectively decelerating the vehicle by means of dynamic braking, regardless of whether or not the current collector is in contact with the power conductor, thereby reducing the duty previously imposed on the mechanical or air braking system of the vehicle. By utilizing the equipment herein disclosed, in the manner described, the majority of the external resistance in the motor circuits both during acceleration and braking is cut out of the circuit in small increments, thereby ensuring that both the acceleration and braking of the vehicle will be produced smoothly without discomfort to the passengers.

Since numerous changes may be made in the above described construction and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a control system, in combination, a plurality of resistor sections, a circular bus-bar divided into a plurality of sections, a plurality of contact members disposed to engage the bus-bar to shunt the resistor sections, a plurality of rollers for moving the contact members into engagement with the bus-bar, means for actuating the rollers, and means for controlling the operation of the last-named means.

2. In a control system, in combination, a plurality of resistor sections, a circular bus-bar divided into a plurality of sections, a plurality of contact members disposed to engage the bus-bar to shunt the resistor sections, a plurality of rollers for moving the contact members into engagement with the bus-bar, a common shaft for operating all of said rollers, means for driving said shaft, and means for controlling the operation of the last-named means.

3. In a control system, in combination, a plurality of resistor sections, a circular bus-bar divided into a plurality of sections, a plurality of contact members disposed to engage the bus-bar to shunt the resistor sections, a plurality of rollers for pressing the contact members into engagement with the bus-bar, a common shaft for operating all of said rollers, a pilot motor for driving said shaft, and means for controlling the speed of the pilot motor.

4. In a control system, in combination, a plurality of resistor sections, a circular bus-bar divided into a plurality of sections, a plurality of contact members disposed to engage the bus-bar to shunt the resistor sections, a plurality of rollers for pressing the contact members into engagement with the bus-bar, a common shaft for operating all of said rollers, a reversible pilot motor for driving said shaft, and means for controlling the direction of rotation and the speed of the pilot motor.

5. In a control system, in combination, a plurality of resistor sections, a circular bus-bar divided into a plurality of sections, a plurality of contact members disposed to engage the bus-bar to shunt the resistor sections, a plurality of rollers for moving the contact members into engagement with the bus-bar, means for actuating the rollers in unison, means for withholding one of said rollers from engaging said contact members during a portion of its cycle of operation, and means for controlling the operation of the roller actuating means.

6. In a motor control system, in combination, a plurality of motors, a source of power for the motors, a plurality of resistor sections for controlling the motor current, a circular bus-bar divided into a plurality of sections, a plurality of contact members disposed to engage the bus-bar to shunt the resistor sections, a plurality of rollers for moving the contact members into engagement with the bus-bar, means for actuating the rollers, and means for controlling the operation of the last-named means.

7. In a motor control system, in combination, a plurality of motors, a source of power for the motors, a plurality of resistor sections for controlling the motor current, a circular bus-bar divided into a plurality of sections, a plurality of contact members disposed to engage the bus-bar to shunt the resistor sections, a plurality of rollers for moving the contact members into engagement with the bus-bar, means for actuating all of said rollers in unison, and means responsive to the motor current for controlling the operation of the last-named means.

8. In a motor control system, in combination, a plurality of motors, a source of power for the motors, a plurality of resistor sections for controlling the motor current, a circular bus-bar divided into a plurality of sections, a plurality of contact members disposed to engage the bus-bar to shunt the resistor sections, a plurality of rollers for pressing the contact members into engagement with the bus-bar, a common shaft for operating all of said rollers in unison, a pilot motor for driving said shaft, and means responsive to the motor current for controlling the speed of the pilot motor.

9. In a motor control system, in combination, a plurality of motors, a source of power for the motors, switching means for connecting the motors to the source of power, a plurality of resistor sections for controlling the motor current, a circular bus-bar divided into a plurality of sections, a plurality of contact members disposed to engage the bus-bar to shunt the resistor sections, a plurality of rollers for pressing the contact members into engagement with the bus-bar, means for actuating the rollers, and means dependent upon the position of said rollers for controlling the operation of said switching means.

10. In a motor control system, in combination, a plurality of motors, a source of power for the motors, switching means for connecting the motors to the source of power, a plurality of resistor sections for controlling the motor current, a circular bus-bar divided into a plurality of sections, a plurality of contact members disposed to engage the bus-bar to shunt the resistor sections, a plurality of rollers for moving the contact members into engagement with the bus-bar, means for actuating the rollers, interlock means actuated by said switching means, and means dependent upon the position of said rollers and cooperating with said interlock means for controlling the direction of rotation of the rollers.

11. In a motor control system, in combination, a motor for propelling a vehicle, a source of power for the motor, switching means for connecting the motor to the source of power, a plurality of resistors for controlling the motor current, a circular bus-bar, a plurality of contact members disposed to engage the bus-bar to shunt the resistors, a roller for actuating the contact members into engagement with the bus-bar, a pilot motor for actuating the roller, and means responsive to the acceleration of the vehicle for controlling the speed of the pilot motor thereby controlling the rate of acceleration of the motor.

12. In a motor control system, in combination, a motor for propelling a vehicle, a source of power for the motor, switching means for connecting the motor to the source of power, a plurality of resistors for controlling the motor current, a circular bus-bar, a plurality of contact members disposed to engage the bus-bar to shunt the resistors, a roller for actuating the contact members into engagement with the bus-bar, a pilot motor for actuating the roller, a limit relay responsive to the motor current, and means responsive to the acceleration of the vehicle and cooperating with the limit relay to control the speed of the pilot motor, thereby controlling the rate of acceleration of the motor.

13. In a motor control system, in combination, a motor, a source of power for the motor, a plurality of resistors for controlling the motor current, a plurality of switches for shunting said resistors, additional resistor sections for controlling the motor current, a circular bus-bar, a plurality of contact members disposed to engage the bus-bar to shunt said resistor sections, a roller for pressing the contact members into engagement with the bus-bar, means for actuating the roller, and means associated with said switches for controlling the operation of the roller actuating means.

14. In a motor control system, in combination, a plurality of motors, a source of power for the motors, a plurality of resistors for controlling the motor current, a plurality of switches for shunting said resistors in sequential relation, a plurality of additional resistor sections for controlling the motor current, a circular bus-bar divided into a plurality of sections, a plurality of contact members disposed to engage the bus-bar to shunt said resistor sections, a plurality of rollers for moving the contact members into engagement with the bus-bar, means for actuating the rollers in unison, and means associated with said switches for controlling the operation of the roller actuating means.

15. In a motor control system, in combination, a plurality of motors, a source of power for the motors, a plurality of resistors for controlling the motor current, a plurality of switches for shunting said resistors in sequential relation, a controller for controlling the operation of said switches, a plurality of additional resistor sections for controlling the motor current, a circular bus-bar divided into a plurality of sections, a plurality of contact members disposed to engage the bus-bar to shunt said resistor sections, a plurality of rollers for pressing the contact members into engagement with the bus-bar, a pilot motor for actuating the rollers in unison, means associated with said switches for controlling the energization of said pilot motor, and means responsive to the main motor current for controlling the speed of the pilot motor.

16. In a motor control system, in combination, a plurality of motors having series field windings, a source of power for the motors, a plurality of resistor sections for controlling the motor current, a circular bus-bar divided into a plurality of sections, a plurality of contact members disposed to engage the bus-bar to shunt the resistor sections, a plurality of rollers for pressing the contact members into engagement with the bus-bar, means for actuating the rollers, switching means for shunting said series field windings, means for energizing said switching means, and means responsive to the motor current for controlling the operation of said switching means.

17. In a motor control system, in combination, a plurality of motors having series field windings, switching means for establishing dynamic braking connections for the motors, means for successively shunting the field winding of the motors by interlock progression during dynamic braking, and means responsive to the motor current for controlling the operation of the field shunting means.

18. In a motor control system, in combination, a plurality of motors having series field windings, switching means for establishing dynamic braking connections for the motors, a master controller for controlling the operation of said switching means, resistors for controlling the motor current during dynamic braking, switching means for shunting the resistors, means for successively shunting the field windings of the motors by interlock progression during dynamic braking, and means responsive to the motor current for controlling the operation of the field shunting means.

19. In a motor control system, in combination, a plurality of motors having series field windings, switching means for establishing dynamic braking connections for the motors, means for successively shunting the field windings of the motors by interlock progression during dynamic braking, and relay means responsive to the motor current for controlling the operation of the first of said successive shunting means.

20. In a motor control system, in combination, a pair of motors having series field windings, means for cross connecting said motors during dynamic braking, means for successively shunting the field windings of the motors by interlock progression during dynamic braking, and relay means responsive to the current in both motors for controlling the operation of the first of said successive shunting means.

LYNN G. RILEY.